Figure 1:
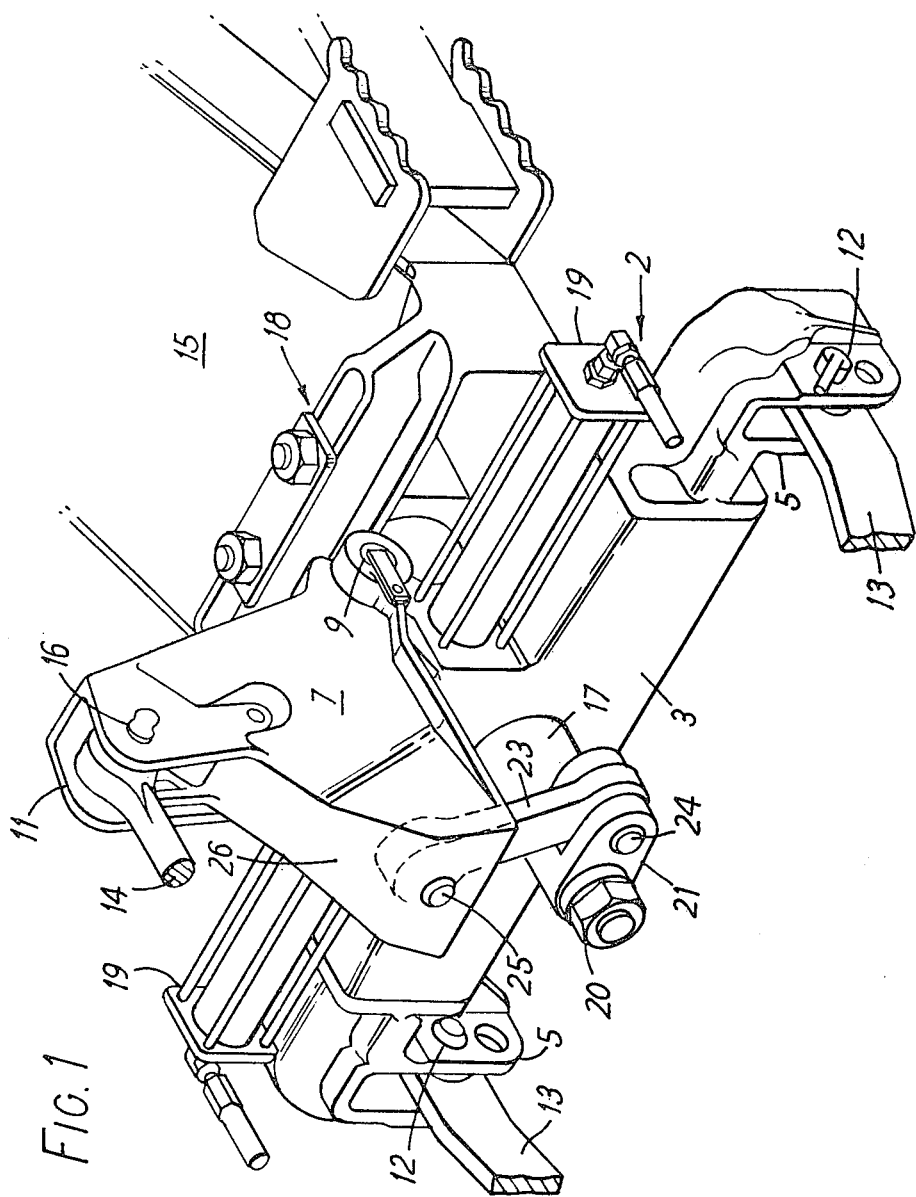

United States Patent [19]

Hawes

[11] 4,326,593
[45] Apr. 27, 1982

[54] REVERSIBLE PLOUGHS

[75] Inventor: Richard J. Hawes, Ipswich, England

[73] Assignee: Ransomes Sims & Jefferies Limited, Ipswich, England

[21] Appl. No.: 175,031

[22] Filed: Aug. 4, 1980

[30] Foreign Application Priority Data

Aug. 6, 1979 [GB] United Kingdom ............... 27378/79

[51] Int. Cl.$^3$ .......................... A01B 3/28; A01B 3/426
[52] U.S. Cl. .................................................. 172/226
[58] Field of Search .............. 172/225, 458, 224, 226, 172/227

[56] References Cited

U.S. PATENT DOCUMENTS 1,560,639 11/1925 Andrews ........................ 172/458 X
2,714,345 8/1955 Wilkerson et al. .
4,154,306 5/1979 Hawes .................................. 172/225

FOREIGN PATENT DOCUMENTS 2360739 6/1975 Fed. Rep. of Germany .
2413331 10/1975 Fed. Rep. of Germany .
7837595 12/1978 Fed. Rep. of Germany .

Primary Examiner—George J. Marlo
Attorney, Agent, or Firm—Browdy and Neimark

[57] ABSTRACT

A reversible plough has a headstock formed from upper and lower parts hingedly connected about a transverse axis, the reversing spindle being mounted in the lower headstock part and carrying a crank arm connected by a link to the upper headstock part. As the reversing spindle is rotated, relative hinging movement between the two headstock parts causes the reversing spindle to tilt in a vertical plane, the load in said link counterbalancing to a degree the offset center of gravity of the plough frame and reducing the torque required to reverse the plough frame. The plough frame carries left handed and right handed plough bodies and the center of gravity of the plow frame is laterally offset from the longitudinal axis of the reversing spindle. The reversing spindle is adapted to be tilted in a vertical plane simultaneously with the reversing spindle being rotated so that the center of gravity of the plough frame can be maintained substantially in a horizontal plane as the plough bodies are being moved to and from their right and left handed plowing positions. The mechanism for rotating the spindle about its longitudinal axis includes a pinion on the reversing spindle and a moveable rack cooperable with the pinion, with the rack being connected between opposed hydraulic pistons.

6 Claims, 13 Drawing Figures

REVERSIBLE PLOUGHS

This invention relates to reversible ploughs in which the plough frame is rotated through approximately 180° about a longitudinal axis to reverse the plough frame between left handed and right handed ploughing positions.

In such ploughs, the centre of gravity of the plough frame will usually be offset laterally from the longitudinal axis about which the frame rotates and the maximum torque required to reverse the frame will be generally determined by the product of the weight of the frame, including the weight of the attached plough bodies, and the amount of lateral offset of the centre of gravity. When the plough frame is reversed, the centre of gravity travels on an arc about the longitudinal axis and the maximum torque is required during the first part of the 180° cycle if the centre of gravity rotates over the longitudinal axis or during the latter part of the cycle if the centre of gravity rotates under the longitudinal axis. The amount by which the centre of gravity of the plough frame is displaced laterally from the longitudinal axis will increase with the number of furrows to be ploughed and with the spacing between adjacent plough bodies, i.e. the furrow width. The amount of offset will also be effected by any lateral adjustment of the plough frame relative to the reversing spindle which must be made, when the tractor is run with one wheel in the furrow, to accommodate different tractor wheel tracks or tire sizes. It will be appreciated that the maximum reversing torque on a plough with a large number of plough bodies, a large furrow width, a small tractor wheel track and a large tire width, is very high, and the plough must be provided with reversing means, usually a hydraulic piston and cylinder arrangement, which is sufficiently powerful to meet this maximum torque requirement.

It has been proposed in the prior art to provide a reversible plough in which the plough frame is connected to the reversible spindle by means of a pivot axle which is vertical in each of the ploughing positions and horizontal in the mid-way or "butterfly" position. Link means are provided fixed at one end relatively to the headstock and connected at the other end to the plough frame, this link means being effective during reversal to pivot the plough frame relatively to the reversing spindle. The geometry is arranged such that the path of the plough frame centre of gravity is not arcuate but more closely approaches a straight line.

There are two main disadvantages of this arrangement, one theoretical and one practical.

It has been explained that the maximum torque requirement occurs at 0° or 180° in the reversing cycle and, indeed, if there are no separate damping means provided and the hydraulic reversing spindle is required to bring the frame gently to rest at the end of the cycle, the maximum torque requirement may occur at both 0° and 180°. In the prior art arrangement, the overall work required to reverse the plough frame is reduced as compared with conventional arrangements essentially because the link referred to applies a moment about the reversing spindle balancing to a degree the moment applied by the laterally offset centre of gravity. It will be recognised, however, that as the pivot axis about which the frame may pivot relative to the reversing spindle is vertical at both 0° and 180° in the cycle, there will be no tendency for the weight of the plough frame to cause it to pivot at these positions and accordingly no load in the link means. Since there is no load in the link means there can be no "balancing" of the offset centre of gravity at 0° and 180°—where of course the maximum torque is required—and the prior art arrangement is therefore not effective to reduce the maximum torque requirement. The prior art arrangement merely reduces the average torque requirement over the cycle.

A practical disadvantage of the prior art arrangement is that the connection between the frame and the reversing spindle cannot be made directly, as is usual, but must include a transverse pivot axle. Great difficulties will be encountered in providing a mounting of this type which is capable of withstanding the forces applied during use and reversal of the plough especially in the case of large ploughs where the advantages to be gained from reducing the reversing torque requirement are greatest. Further, the need for a link to be connected between the frame and the headstock will present difficulties, since such a link will sweep out a significant volume which must be kept clear.

It is an object of this invention to provide an improved reversible plough in which the maximum reversing torque requirement is reduced enabling the use of less powerful reversing means. It is a further object to provide such a reversible plough which is no less rugged or reliable than conventional reversible ploughs.

Accordingly, the present invention consists in a reversible plough comprising a headstock for connection to a tractor; a reversing spindle mounted in the headstock for rotation about a generally longitudinal axis; a plough frame carrying left handed and right handed plough bodies and secured to the reversing spindle for rotation therewith between left and right handed ploughing positions, the plough frame having a centre of gravity which is offset laterally of said axis; means in the headstock for rotating the reversing spindle relative thereto to reverse the plough frame from one ploughing position to the other, and mechanism arranged upon rotation of the reversing spindle so to displace the plough frame vertically that the centre of gravity of the plough frame is maintained substantially in a horizontal plane, characterised in that said mechanism comprises means eccentrically connected with the reversing spindle and serving to tilt the reversing spindle in a vertical plane concomitantly with the rotation thereof, said eccentrically connected means applying to the reversing spindle an amount of torque about said axis which is opposed to the torque associated with the offset plough frame centre of gravity and which is substantial when said latter torque is at a maximum.

Advantageously, the headstock comprises an upper part adapted for connection to a tractor top link and a lower part hingedly connected to the upper part about a transverse axis and adapted for connection to the tractor lower links, the reversing spindle being mounted in a first one of said headstock parts, the means eccentrically mounted on the reversing spindle being cooperable with the second headstock part to effect relative hinging movement of the two headstock parts concomitantly with rotation of the reversing spindle.

Since the additional torque applied to the reversing spindle balancing the torque associated with the offset centre of gravity is substantial when that latter torque is at a maximum, the maximum torque required from the reversing means is reduced and not merely the average torque requirement. Since the mechanism operates by tilting the reversing spindle in a vertical plane the connection between the plough frame and the reversing spindle can be of conventional form and there is no necessity for links to be connected between the plough frame and the headstock.

The invention will now be described by way of example with reference to the accompanying drawings in which:

FIG. 1 is a perspective view, generally from the front, of the headstock and forward frame part of a reversible plough according to this invention, FIGS. 2(a) to (e) are diagrams showing in end elevation the displacement of the plough frame centre of gravity in a vertical plane at successive instants in the reversing cycle, FIGS. 3(a) to (e) are diagrammatic side elevations showing the relative orientations of the hinged headstock parts and of the longitudinal reversing axis at instants corresponding respectively with FIGS. 2(a) to (e).

Figure 4:
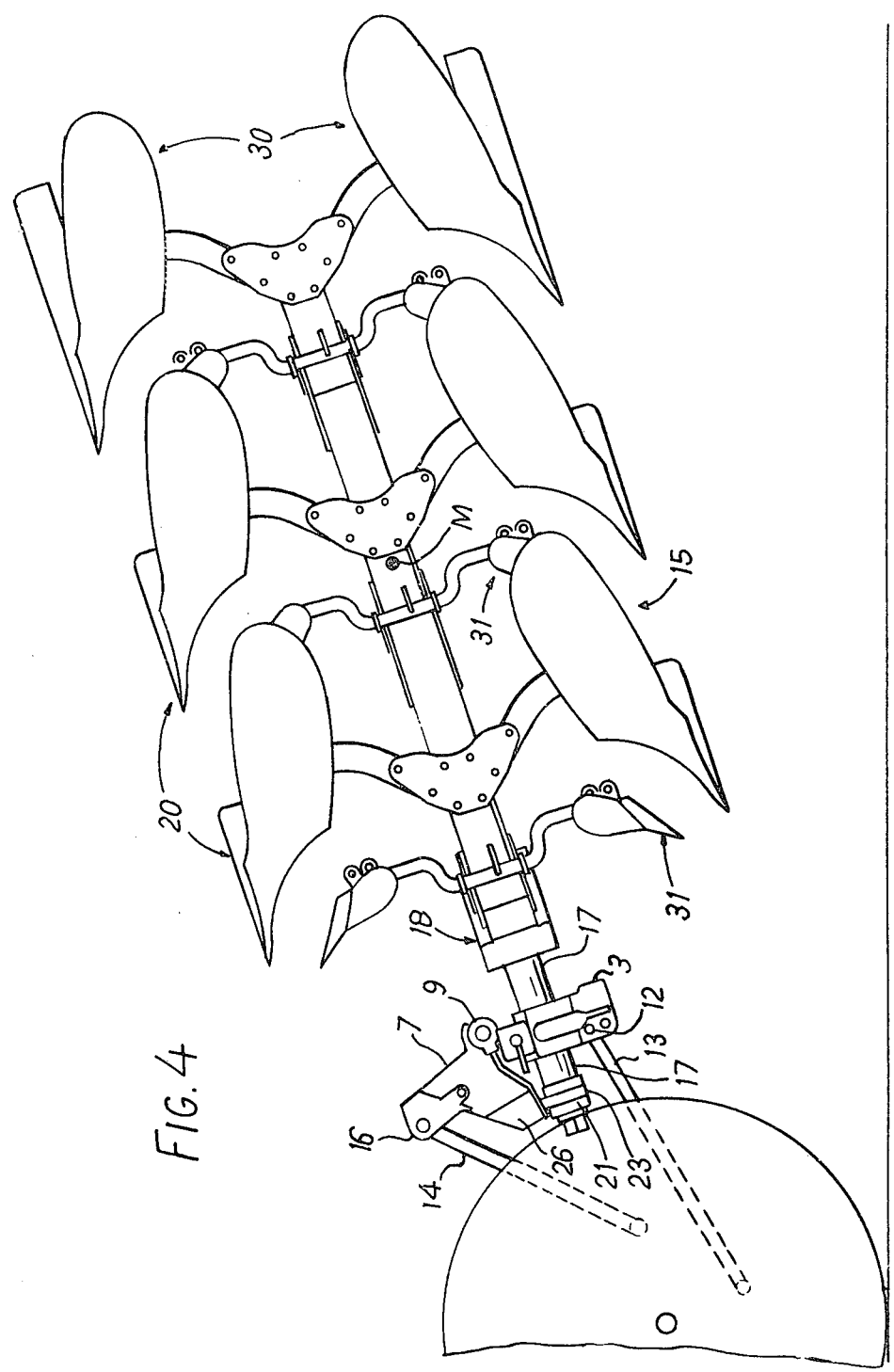
Figure 5:
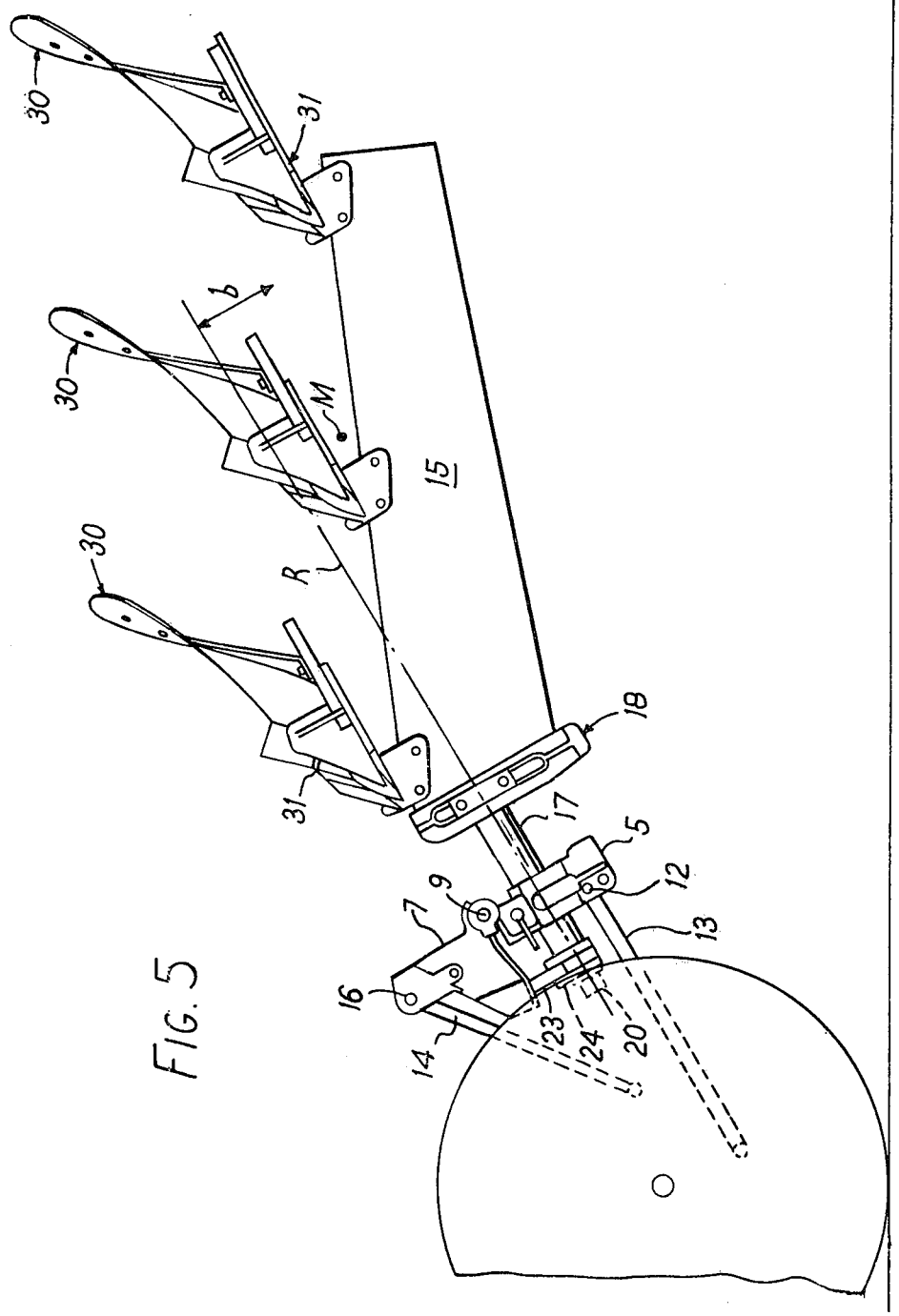

FIG. 4 is a side view of the plough of FIG. 1 shown in its entirety with the plough frame in a raised position preparatory to reversal thereof, and FIG. 5 is a side view corresponding to FIG. 4 with the plough frame in a mid-way position of reversal.

The plough headstock shown generally at 2 comprises a cross piece 3 carrying inverted U-shaped link connecting members 5 at opposite transverse ends thereof and a mast 7 which is hingedly connected to the cross piece 3 for rotation about a transverse shaft 9 and which carries at its upper end a link connecting member 11. As shown in the drawing, the tractor lower links 13 are pivotally connected through pins 12 to the respective connecting members 5 and the tractor top link 14 is pivotally connected through pin 16 to the connecting member 11.

The plough frame 15, only the forward part of which is shown in FIG. 1, is secured to a reversing spindle 17 through a mounting shown generally at 18 which permits lateral adjustment of the plough frame relative to the reversing spindle. The frame carries plough bodies 30 and coulters 31 in a conventional manner. The reversing spindle is mounted in bearings (not shown) in the cross piece 3 for rotation about a generally longitudinal axis and a hydraulic piston and cylinder arrangement comprising a pair of opposed cylinders 19 is provided for rotating the reversing spindle through approximately 180° relative to the headstock to effect reversal of the plough frame. This rotation is effected by means of a rack connected between opposed pistons of the assembly and cooperable with a pinion carried on the reversing spindle; these interior parts not being shown in the drawing. Various other mechanisms could of course be employed for this purpose and more detailed explanation is not felt necessary.

Forwardly of the cross piece 3, the reversing spindle 17 carries a rigid crank arm 21 secured by nut 20. The crank arm is bifurcated to receive one end of a link or con rod 23 and is pivotally connected thereto through pin 24. The other end of link 23 is pivotally connected to the mast 7, within a forwardly directed shell portion 26 thereof, by means of pivot pin 25.

Figure 2:
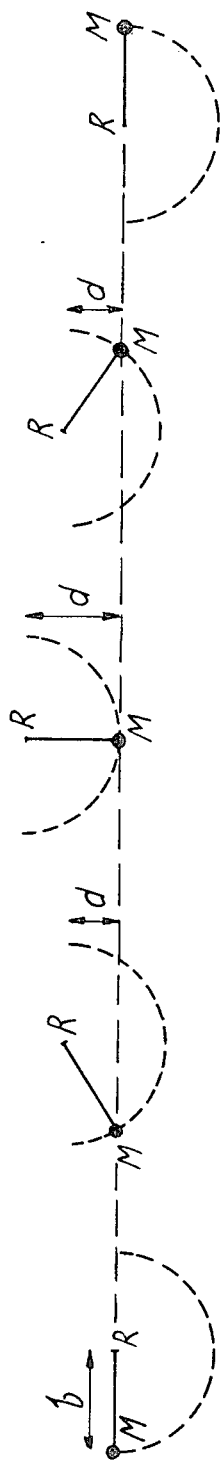
Figure 3:
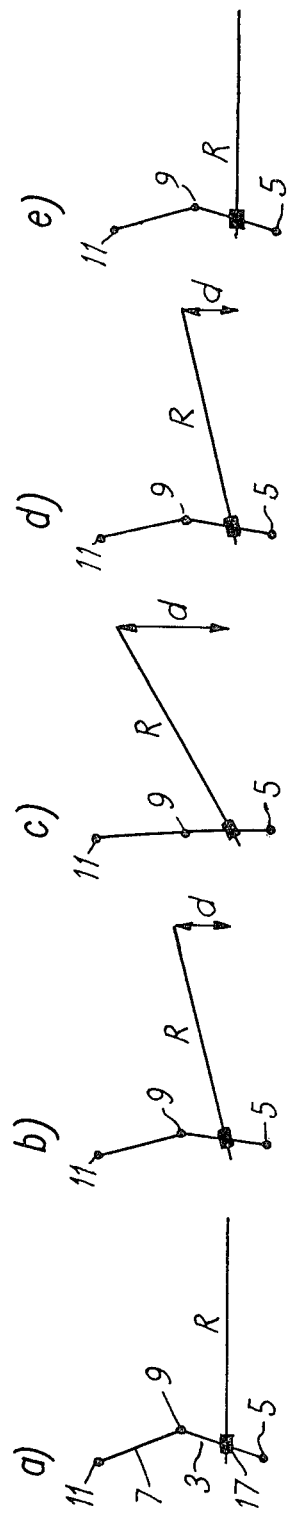

To clarify the operation of headstock 2 during reversal, reference will be had to the diagrams of FIGS. 2 to 5, inclusive. In FIG. 2(a), the centre of gravity M of the plough frame is shown schematically as offset a distance b laterally of the longitudinal reversing axis R. FIG. 2 is a diagrammatic end view and the offset of the centre of gravity M is accordingly to the opposite side of the reversing spindle from crank arm 21 as seen in FIG. 1. FIG. 3(a) shows the headstock mast 7 schematically as a line joining upper connecting member 11 with transverse shaft 9 and the headstock cross piece 3 as a line joining the transverse shaft 9 and the lower connecting members 5; the longitudinal reversing axis R is defined by the reversing spindle 17 carried in the cross piece 3. FIGS. 2(a) and 3(a) correspond to the position of the plough frame as shown in FIG. 4.

As the reversing cycle is initiated by activation of the hydraulic piston and cylinder arrangement 19, reversing spindle 17 begins to rotate counter-clockwise as viewed from the left in FIG. 1. Through this rotation and the consequent movement of crank arm 21 and line 23, the forward end of the reversing spinlde 17 and the forward shell portion 26 of the mast 7 are urged apart and the angle between the headstock mast 7 and cross piece 3 is progressively increased with the cross piece 3 and hence the reversing spindle 17 rotating about a transverse horizontal axis passing through lower link connecting members 5. FIG. 3(b) shows the effect on the orientation of the longitudinal axis R of the tilting movement of the reversing spindle and it can be seen that the plough frame is lifted vertically a distance d in the vertical plane containing the centre of gravity. As can be seen from FIG. 2(b) the combined effect of the initial rotation of the plough frame and of the vertical displacement is that the centre of gravity M moves along substantially a horizontal line. At this stage in the reversing cycle, the compressive load in link 23 exerts a moment upon the reversing spindle which is opposed to the moment associated with the laterally offset centre of gravity M effectively cushioning the "fall" of the plough frame and ensuring that reversing spindle rotates in a controlled fashion. This distance d reaches a maximum at the mid-way position shown in FIG. 3(c) corresponding to the maximum drop of the centre of gravity M relative to the rearwardly extropolated reversing axis R as shown in FIG. 2(c). At this stage, which corresponds to the position shown in FIG. 5, the link 23 and the crank arm 21 lie in a straight line and the moment applied by the link to the reversing spindle is reduced to zero, as is of course the moment associated with the offset centre of gravity. With continued rotation of the reversing spindle, the separation between the forward end of the reversing spindle 17 and the forward shell portion 26 of the mast 7 will decrease and the cross piece 3 together with the reversing spindle 17 will rotate about the axis passing through lower link connecting members 5, in the opposite sense. The distance d will decrease as shown in FIGS. 2(d) and 3(d). During this part of the reversing cycle, the moment applied to the reversing spindle by link 23 opposes the moment associated with the offset centre of gravity M so reducing the level of torque that is required from the hydraulic cylinders 19. This state continues up to the 180° position in the cycle where the moment associated with the offset centre of gravity M is at a maximum and it can be seen that the moment applied by the link 23 also reaches a maximum at this point.

As can be seen from FIG. 2, the combined effect of the rotation of the plough frame and of the tilting of the reversing spindle is that the centre of gravity M remains in a substantially horizontal plane. Since the moments about the reversing spindle of the compressive load in link 23 and the offset centre of gravity, respectively, are opposed and in phase, not only is the average level of torque required from the cylinders 19 reduced, but also the peak torque requirement. Accordingly, the hydraulic cylinders can be smaller and less powerful as compared with similar sized ploughs used hitherto. A further advantage of the present invention is that as a consequence of the vertical displacement during reversal, there is increased clearance between the frame and the ground. This is particularly important in the case where the frame is reversed to bring a depth wheel underneath the longitudinal reversing axis where problems of ground clearance have in the past not infrequently arisen.

It should be appreciated that FIGS. 2(a) to (e) show the optimum locus of the centre of gravity, which is of course a horizontal line. In practice, this optimum performance can only be achieved when the parameters: tractor wheel track, tire size, furrow width and number of furrows correspond exactly with those for which the geometry of the headstock was designed. Thus it can be seen that the angle through which the reversing spindle 17 must be tilted to give the required lift d in the vertical plane containing the centre of gravity will depend upon the lateral offset b of the centre of gravity and on the longitudinal separation between the centre of gravity and the horizontal axis about which the reversing spindle is tilted. To enable the described mechanism to approach more closely the optimum performance in situations where the parameters mentioned above are likely to be varied, a modification can be carried out in which the arm 21 is rendered adjustable to vary the radial distance between the reversing spindle 17 and the lower end of link 23. This adjustment would serve to vary the amount by which the reversing spindle 17 is tilted during the 180° reversing cycle.

This invention has been described by way of example only and a variety of modifications can be made to the described embodiment without departing from the scope of the invention. Thus, for example, the assembly of arm 21 and link 23 could be replaced by other means, such as a cam carried on the reversing spindle, for varying the angle between the two headstock parts. The transverse shaft 9 could in a further modification be disposed below rather than above the longitudinal reversing axis, the reversing spindle then being carried in the upper rather than the lower of the two headstock parts. In yet a further modification, the tilting of the reversing spindle about a horizontal axis can be achieved by means other than the described articulation between two hingedly interconnected headstock parts. For example, means could be provided for varying the effective length of the tractor top link concomitantly with rotation of the reversing spindle. The skilled reader will appreciate that while the above description has been confined to cases in which reversal of the plough frame tends to move the centre of gravity of the plough frame in an arc beneath the reversing axis, the invention is equally applicable to cases in which reversal tends to lead to lifting of the centre of gravity; in this case the required vertical displacement of the plough frame will of course be in the downward rather than in the upward direction. The modifications required to achieve this downward displacement will be apparent to the ordinarily skilled worker in the art; one approach being of course to position the crank arm 21 rearwardly rather than forwardly of the headstock.

What is claimed is:

1. A reversible plough comprising a headstock for connection to a tractor; a reversing spindle mounted in the headstock for rotation about a generally longitudinal axis; a plough frame carrying left handed and right handed plough bodies and being secured to the reversing spindle for rotation therewith between left and right handed ploughing positions, the plough frame having a centre of gravity which is offset laterally of said axis; means in the headstock for rotating the reversing spindle relative thereto to reverse the plough frame from one ploughing position to the other and a mechanism arranged upon rotation of the reversing spindle so to displace the plough frame vertically that the centre of gravity of the plough frame is maintained substantially in a horizontal plane, characterised in that said mechanism comprises means eccentrically connected with the reversing spindle and serving to tilt the reversing spindle in a vertical plane concomitantly with the rotation thereof, said eccentrically connected means applying to the reversing spindle an amount of torque about said axis which is opposed to the torque associated with the offset plough frame centre of gravity and which is substantial when said latter is at a maximum.

2. A reversible plough according to claim 1, wherein the headstock comprises an upper part adapted for connection to a tractor top link and a lower part hingedly connected to the upper part about a transverse axis and adapted for connection to the tractor lower links, the reversing spindle being mounted in a first one of said headstock parts, the means eccentrically mounted on the reversing spindle being cooperable with the second headstock part to effect relative hinging movement of the two headstock parts concomitantly with rotation of the reversing spindle.

3. A reversing plough according to claim 2, wherein said means eccentrically mounted on the reversing spindle comprises a link pivotally connected at one end thereof to a cranked arm which is rigid with the reversing spindle, the other end of said link being pivotally connected to the second headstock part.

4. A reversible plough according to claim 2 or claim 3, wherein the headstock is mounted in the lower headstock part.

5. A reversible plough according to claim 2, wherein said means for rotating the reversing spindle comprises hydraulic piston and cylinder means horizontally disposed in said lower headstock part.

6. A reversible plough according to claim 1, wherein the plough frame is secured to the reversing spindle through a mounting providing for lateral adjustment of the plough frame relative to the reversing spindle.

* * * * *

UNITED STATES PATENT AND TRADEMARK OFFICE
CERTIFICATE OF CORRECTION

PATENT NO. : 4,326,593
DATED : April 27, 1982
INVENTOR(S) : Richard J. HAWES

It is certified that error appears in the above—identified patent and that said Letters Patent are hereby corrected as shown below:

Column 6, line 29, after "latter" insert --torque--

Signed and Sealed this

Third Day of August 1982

[SEAL]

Attest:

GERALD J. MOSSINGHOFF

Attesting Officer

Commissioner of Patents and Trademarks